Figure 1:
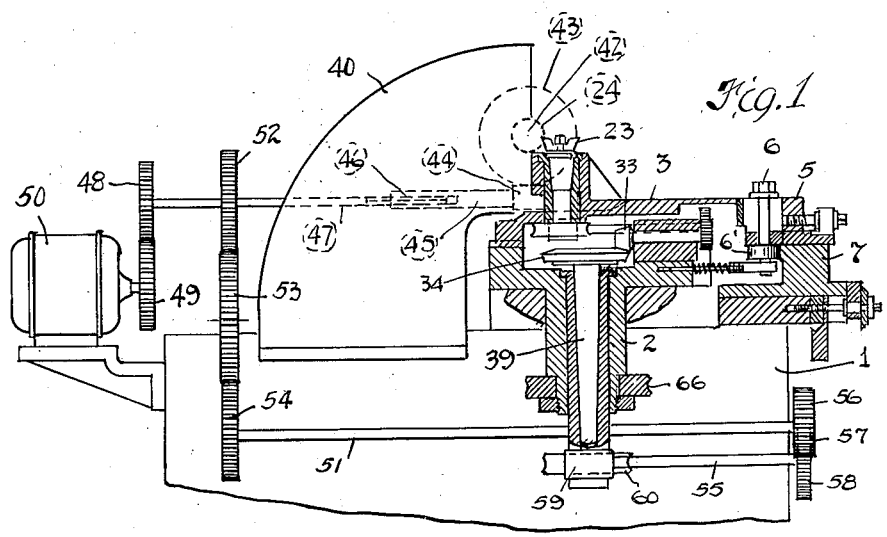

Dec. 17, 1940.   J. R. RICHER   2,224,988
WORM CUTTING MACHINE
Filed April 21, 1937   5 Sheets-Sheet 1

INVENTOR.
Joseph R. Richer
BY Fay, Oberlin & Fay
ATTORNEYS.

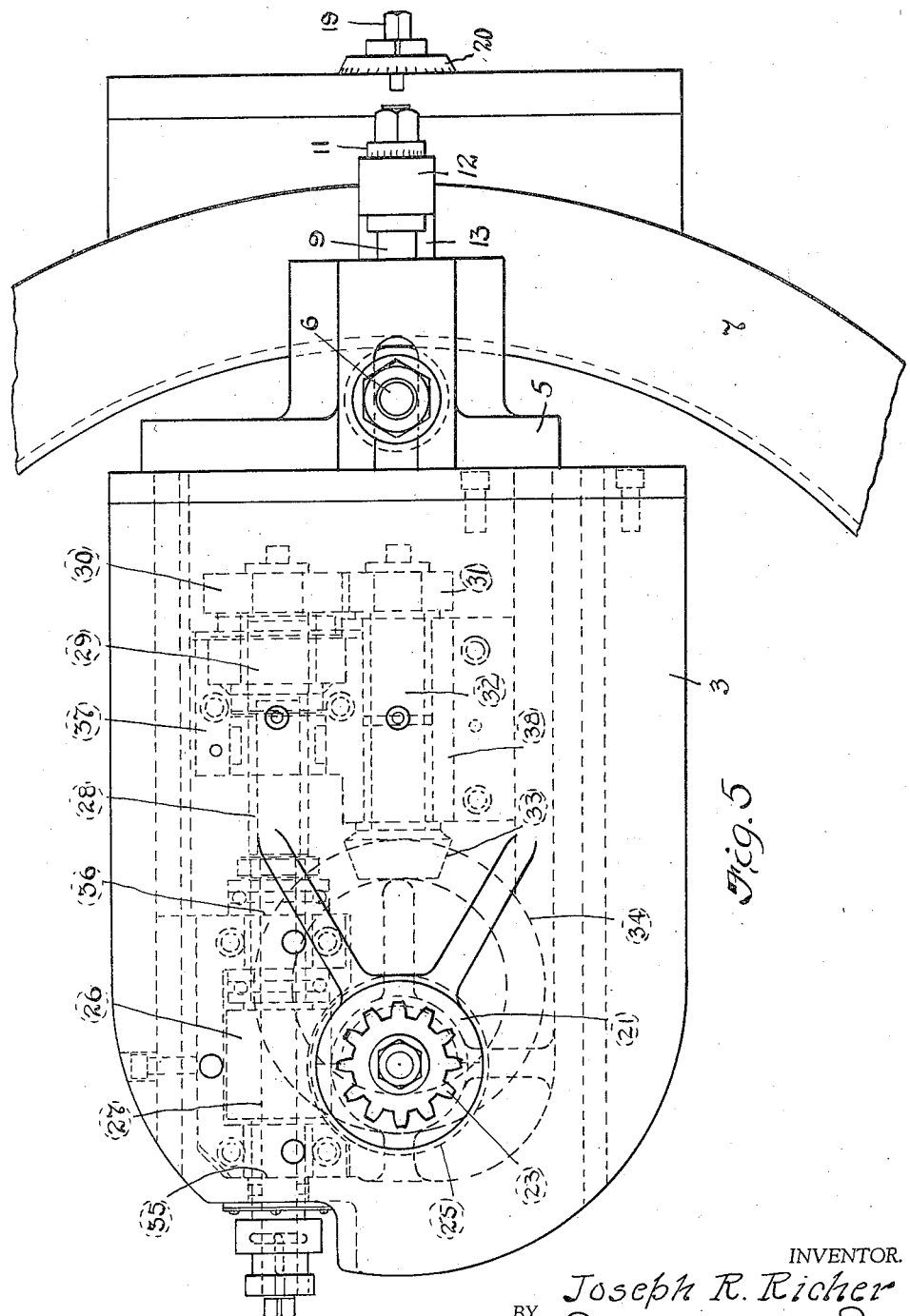

Dec. 17, 1940.                J. R. RICHER                  2,224,988
                          WORM CUTTING MACHINE
             Filed April 21, 1937           5 Sheets-Sheet 5
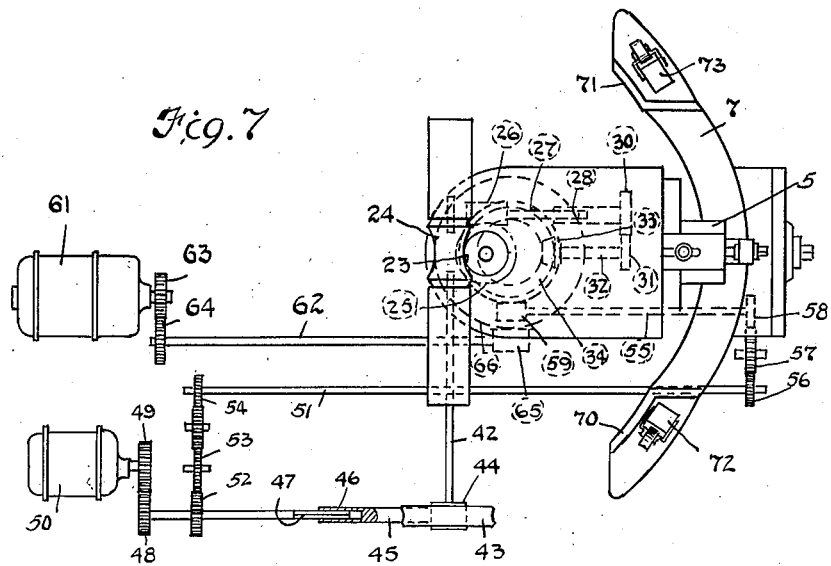
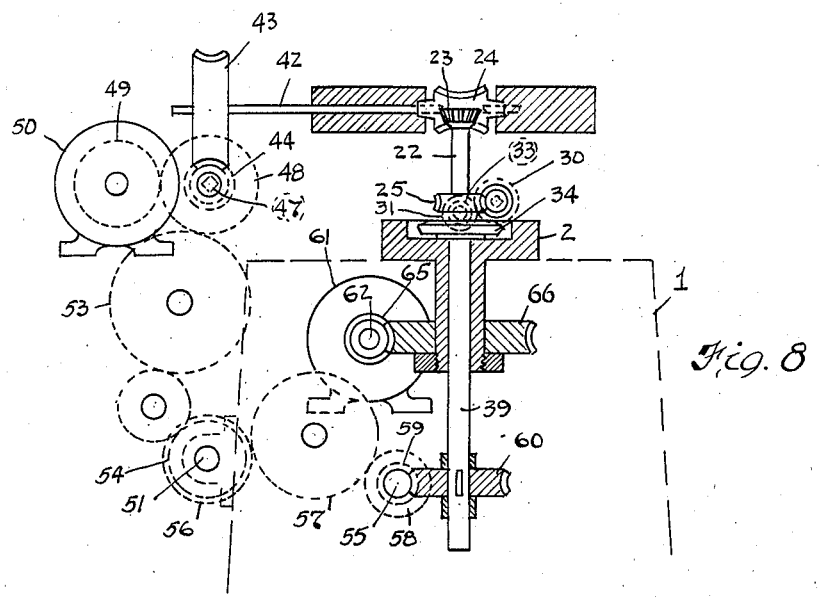
INVENTOR.
Joseph R. Richer
BY Fay, Oberlin & Fay
ATTORNEYS.

Patented Dec. 17, 1940

2,224,988

UNITED STATES PATENT OFFICE 2,224,988

WORM CUTTING MACHINE

Joseph R. Richer, Lakewood, Ohio, assignor to The National Tool Company, Cleveland, Ohio, a corporation of Ohio Application April 21, 1937, Serial No. 138,159

7 Claims. (Cl. 90—4)

The present invention relates to a machine for cutting worms of the hour glass type, alternatively known as globoid and Hindley worms. More particularly, the invention relates to an apparatus for making such worms, employing the molding, generating principle, and wherein a cutter of less diameter and having a less number of teeth than the worm wheel with which the finished worm is intended to mesh is rotated about its own axis in timed relation with the rotation of the worm or work, and is also traversed through a curved path or orbit corresponding to the contour of the pitch line of the finished worm.

One of the objects of my invention is to provide means for so varying and controlling the path of the orbit through which the axis of the cutter travels as to produce a worm whose pitch line has a varying radius of curvature. Such worms, wherein the radius of curvature of the pitch line in the threads adjacent its ends is greater than the radius of curvature of the pitch line of the threads in its intermediate portion are particularly well adapted for use in automotive vehicle steering gear mechanisms, wherein it is desired to have the worm wheel or segment corresponding thereto make an initially close fit with the intermediate portion of the threads of the worm and a loose fit with the end portions of such threads so that subsequent wear which is usually concentrated and is greatest at the intermediate threads can be subsequently adjusted after a period of use without producing a binding action on the end threads of the worm.

Briefly outlined, my invention comprises means for rotating the work or worm blank, rotating a gear shaped cutter about its own axis in timed relation with the rotation of the worm and also about a parallel removed axis or through an orbit parallel to the pitch line of the finished worm, together with means for controlling the path and degree of curvature of such orbit. Additional objects and advantages of the invention shall become apparent as the following description proceeds.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 6:
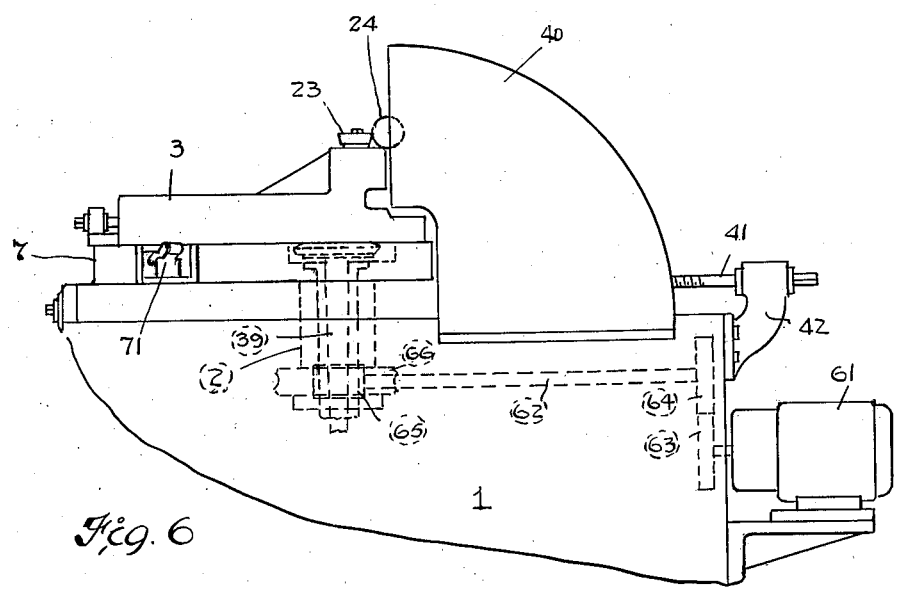
Figure 2:
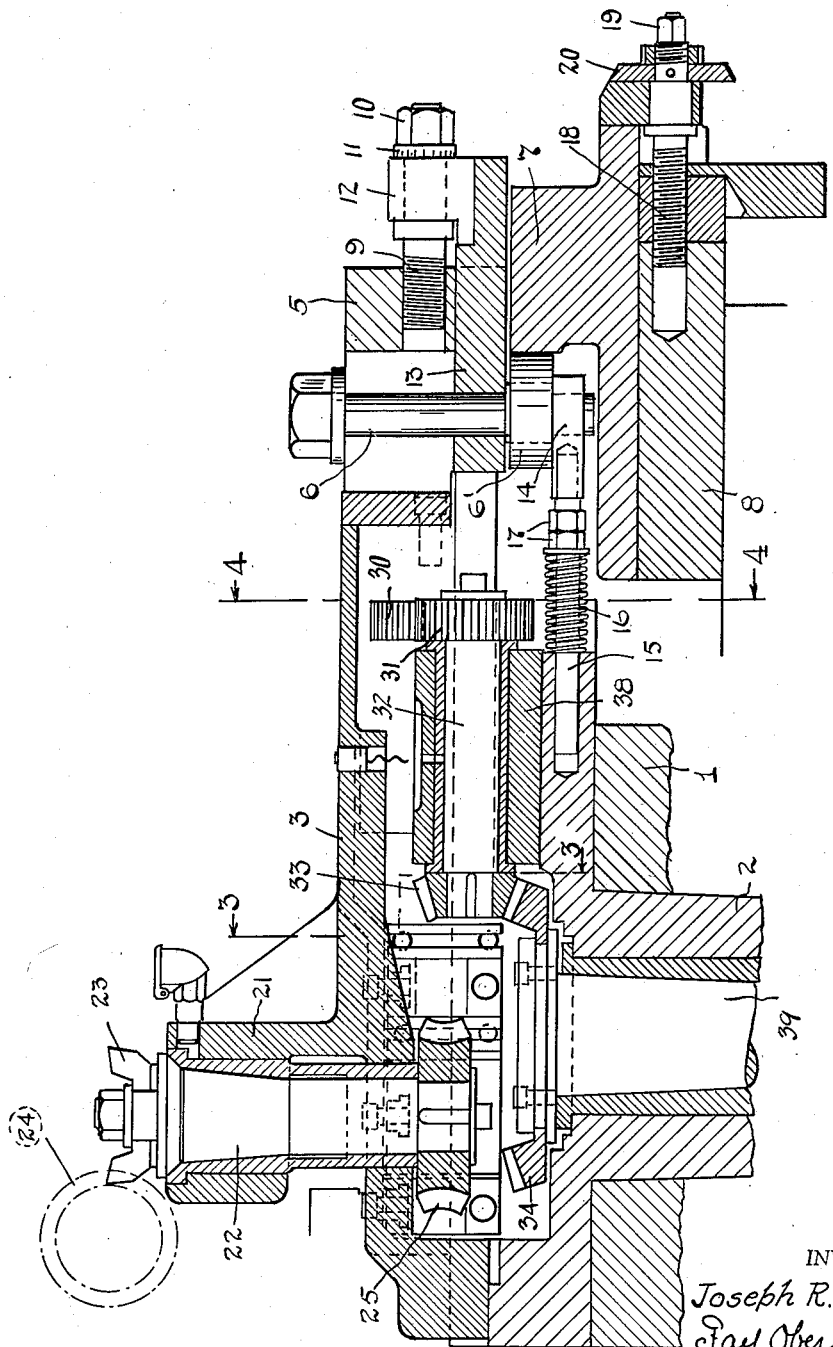
Figure 3:
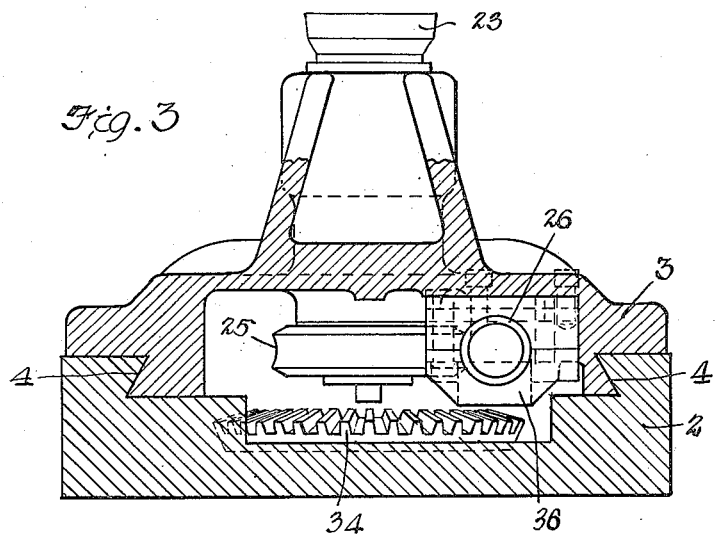
Figure 4:
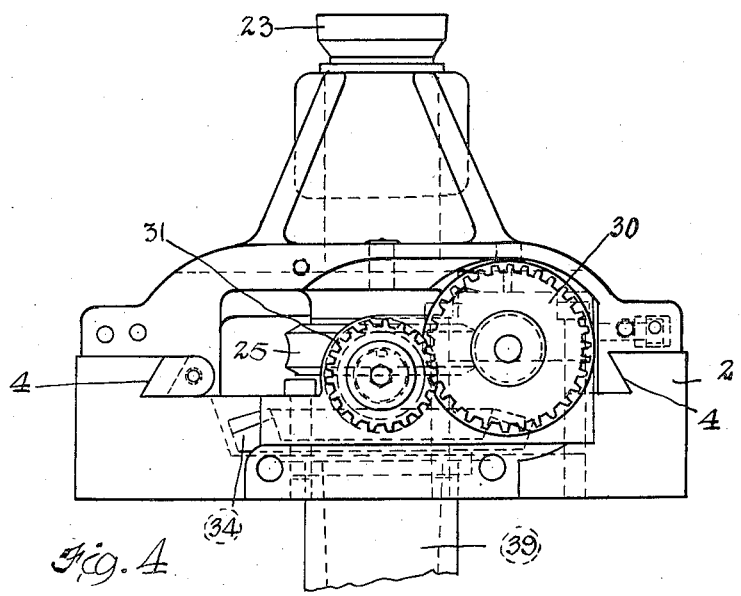

In said annexed drawings:

Fig. 1 is an elevational view, partially in section, of an apparatus embodying the principle of my invention; Fig. 2 is an enlarged sectional view of that portion of the apparatus shown in Fig. 1 comprising the cutter mounting and operating mechanism; Fig. 3 is a transverse sectional view taken substantially along line 3—3 of Fig. 2; Fig. 4 is a transverse sectional view taken along line 4—4 of Fig. 2; Fig. 5 is a top plan view of the portion of the apparatus shown in Fig. 2; Fig. 6 is a plan view of a portion of one side of the apparatus opposite to that shown in Fig. 1; Fig. 7 is a more or less diagrammatic view taken in a horizontal plane and illustrating the power driven connections and gearing of the apparatus; and Fig. 8 is a more or less diagrammatic view taken upon a vertical plane showing the power driven connections and gearing of the apparatus.

Now referring more particularly to the drawings, and especially Figs. 1 to 6 thereof, the apparatus shown therein comprises a supporting frame or bed 1 upon which there is mounted the rotatable member 2 upon which the carriage 3 is slidably mounted by means of the dove tail slides 4. A casting 5 is bolted to one end of the carriage 3 and has an elongated vertical slot through which the bolt 6 extends. The lower end of the bolt 6 carries a roller 6' adapted to bear against the lateral face of the segment shaped abutment 7. The latter is in turn slidably mounted on the base plate 8 which is bolted to the bed 1.

An adjustment screw 9 threadably engages with the casting 5 and carries a nut 10 on its end for engagement with a suitable wrench or tool. A gauge or vernier 11 is also carried on the adjusting screw 9 for the purpose of indicating relative positions of adjustment. The adjusting screw 9 extends through the boss 12 on the slidable plate 13 which is longitudinally movable with respect to the casting 5 and the carriage 3. The bolt 6 passes through the slidable plate 13 and carries a yoke or collar 14 on its lower end which is in turn resiliently connected by means of the rod or bar 15 and the compression spring 16 to the rotatable member 2. The end of the rod 15 is mounted in a drilled recess in the rotatable member 2 and the compression spring 16 bears against the face of the rotatable member 2 adjacent such drilled hole and its pressure is adjustable by means of the lock nuts 17 bearing against the washer on its other end.

A second adjusting screw 18 is provided for adjustably regulating the position of the segment 7 with respect to the bed 1. The adjusting screw 18 threadably engages with the base plate 8 and is axially locked in a boss extending downwardly from the base of the segment 7. A tool receiving end 19 and a gauge or vernier 20 are located on the outer end of the adjusting screw 18.

The carriage 3 has an upwardly projecting housing 21 in which the cutter shaft 22 is rotatably mounted. A gear shaped cutting tool 23 is located on the upper end of the shaft 22 and adapted to contact with the worm blank 24. The teeth of the cutter 23 have such a form and profile as to cut teeth upon the worm 24 according to the molding generating principle.

A worm wheel 25 is mounted on the lower end of the cutter shaft 22 and meshes wtih a worm 26 carried by the horizontally disposed shaft 27. The shaft 27 is in turn connected to the shaft 29 through the medium of a spline fitting 28. A gear 30 on the end of the shaft 29 meshes with a gear 31 on the parallel shaft 32. A pinion gear 33 on the other end of the shaft 32 meshes with the ring gear 34. The shaft 27 is carried by the carriage 3 by means of the bearings 35 and 36 mounted on its under side. The shafts 29 and 32 are journalled in the bearings 37 and 38 respectively which in turn are mounted upon the rotatable member 2. The ring gear 34 is mounted on the upper end of the vertical tapered drive shaft 39 extending through and rotatable with respect to the rotatable member 2.

Directing attention to Figs. 1 and 6, the work or worm blank 24 is carried in a headstock 40 which is slidably mounted upon the bed 1 and is movable thereover by means of the adjusting screw 41.

The worm blank 24 is mounted in a suitable rotatable support or arbor 42 to which is connected the worm wheel 43. The latter meshes with a worm 44 on the shaft 45 which in turn is connected through the spline fitting 46 to the shaft 47. The shaft 47 is geared to the drive motor 50 through the gears 48 and 49. Another shaft 51, parallel to the work driving shaft 47 is connected thereto through the gear 52 mounted on the shaft 47, the idler gear 53 and the gear 54 mounted on the shaft 51. The shaft 51 is connected to a counter shaft 55 through a set of change gears 56, 57 and 58.

The counter shaft 55 is connected to the vertical shaft 39 by means of the worm 59 and worm wheel 60.

From the above description, it will be seen that the drive motor operates to rotate both the worm 24 and the cutter 23 in timed relation. The ratio of this timed relation can of course be varied by means of the change gears 56, 57 and 58.

A speed reducing, reversible drive motor 61 is connected to the shaft 62 through the gears 63 and 64. The shaft 62 is in turn connected to the rotatable member 2 through the worm 65 and the worm wheel 66. Thus the motor 61 is effective to rotate the rotatable member 2, together with the slidable carriage 3 about the axis of the rotatable member 2, which of course is a fixed axis, with respect to the other parts of the machine. Of course as the rotatable member 2 is rotated about its axis, the roller 6' will bear against the face of the segment 7 and will thereby control the arc through which the axis of the cutter 23 passes. Inclined plates 70 and 71 which are in effect portions of the face of the segment 7 are mounted on each end of the latter and are inclined outwardly from the inner, lateral face of the segment 7. The inclined plates 70 and 71 are for the purpose of controlling the initial movement of the cutter as it comes in contact with the worm blank and operate to bring the cutter in gradually to the full cutting depth at the beginning of the cut and at the beginning of the rotation of the rotatable member 2. Limit switches 72 and 73 are provided adjacent each end of the segment 7 and are adapted to be contacted by a portion of the casting 5 carried by the slidable carriage 3, so that such limit switches will be actuated each time that the rotatable member travels through an arc corresponding to the length of the worm thread cut. The limit switches 72 and 73 are of course connected in customary manner to the reversible motor 61. After the rotatable member 2 carries the axis of the cutter 23 once across the face of the worm blank 24, the worm thread cut is finished, the motor 61 is automatically stopped, and a new worm blank is loaded in the machine and then cut upon reverse rotational movement of the rotatable member 2.

It will thus be seen that when the center of the arc of the segment 7 coincides with the fixed center or axis of the rotatable member 2, that the axis of the cutter 3 will then be caused to travel through a true arc, or an arc whose radius is constant. But if the segment 7 is moved away from the fixed axis of the rotatable member 2, or conversely towards the fixed axis, there will result a variation in the radius of curvature of the arc through which the axis of the cutter 23 is traversed. If the segment 7 is moved further away from the fixed axis of the rotatable member 2, that is, to a position where the center of its arc falls to the right (with respect to Fig. 7) of the fixed axis, then the curvature of the path of the axis of the cutter 23 will be greater than that of the true arc path. And correspondingly if the segment 7 is moved closer to the fixed center of the rotatable member 2, the curvature of the path of the axis of the cutter 23 will become lessened, or tend to straighten out. Since the orbit or path of travel of the axis of the cutter 23 determines the pitch line of the worm 24, it will thus be seen that the curvature and form of the pitch line of the fiinished worm can be controlled and regulated by means of adjustment of the position of the segment 7.

It will thus be seen that by virtue of the fact that the roller 6' bears against the lateral face of the segment 7, and that the carriage 3 is slidable with respect to the rotatable member 2, that the axis of the cutter 23 has a possible motion toward and away from the axis of the worm 24, and that this latter motion is controlled by the contour and relative position of the segment 7 and that the lateral face of the segment 7 (including the inclined end blocks 70 and 71) functions as a control line or templet governing such movement of the axis of the cutter 23 with respect to the axis of the worm 24.

In the event that a worm of larger diameter is to be cut, or a cutter or cutters of varying sizes are to be used adjustments are provided for the accommodation thereof. These adjustments consist first, in the adjusting screw 41 by means of which the headstock may be moved toward and away from the rotatable member 2; and secondly, in the adjusting screw 9 by means of which the relative position of the slidable carriage 3 on the rotatable member 2 (and accordingly the position of the axis of the cutter 23 with respect to the fixed axis of the rotatable member 2) can be adjusted.

It will also be noted that the rotation of the cutter 23 possesses a differential action with respect to the rotation of the rotatable member 2. That is to say, assuming that the ring gear 34 were held stationary, while the rotatable member 2 is rotated, the cutter 23 would still be subject to rotation about its own axis by reason of the fact that the pinion gear 23 would then be given a rotational movement as it walks around the ring gear 34. Thus, the rotational position of the cutter 23 with respect to its own axis is in timed relation with respect to the rotational position of the rotatable member 2. Therefore, the rotation of the cutter 23 about its own axis, when the drive shaft 51 and counter shaft 55 are operated, is not only in timed relation to the rotation of the worm 24, but also in timed relation to the rotatable member 2, i. e., in timed relation to its position in the curved path or orbit through which the axis of the cutter is traversed.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a machine for cutting worms of the hour glass type, the combination of a molding generating type gear shaped cutter mounted with its axis normal to the axis of the worm to be cut, means for traversing the axis of said cutter about a fixed axis parallel thereto and removed from the axis of said worm, means for moving the axis of said cutter toward and away from said fixed axis during such traversing movement, an arcuate templet located on the opposite side of said axis to that of the axis of said cutter, the center of the radius of the arc of said templet being disposed toward said fixed axis, and means for connecting said last named moving means to said templet for controlling the movement of the axis of said cutter toward and away from said fixed axis.

2. In a machine for cutting worms of the hour glass type, the combination of a molding generating type gear shaped cutter mounted with its axis normal to the axis of the worm to be cut, means for traversing the axis of said cutter about a fixed axis parallel thereto and removed from the axis of said worm, means for moving the axis of said cutter toward and away from said fixed axis during such traversing movement, an arcuate templet located on the opposite side of said axis to that of the axis of said cutter, the center of the radius of the arc of said templet being disposed toward said fixed axis, means for connecting said last named moving means to said templet for controlling the movement of the axis of said cutter toward and away from said fixed axis, and adjustable means for varying the location of said templet with respect to said fixed axis.

3. In a machine for cutting worms of the hour glass type, the combination of a molding generating type gear shaped cutter mounted with its axis normal to the axis of the worm to be cut, means for traversing the axis of said cutter about a fixed axis parallel thereto and removed from the axis of said worm, means for moving the axis of said cutter toward and away from said fixed axis during such traversing movement, an arcuate templet located on the opposite side of said axis to that of the axis of said cutter, the center of the radius of the arc of said templet being disposed toward said fixed axis, means for connecting said last named moving means to said templet for controlling the movement of the axis of said cutter toward and away from said fixed axis, and means for rotating said cutter about its own axis in timed relation to the rate of rotation of said worm.

4. In a machine for cutting worms of the hour glass type, the combination of a molding generating type gear shaped cutter mounted with its axis normal to the axis of the worm to be cut, means for traversing the axis of said cutter about a fixed axis parallel thereto and removed from the axis of said worm, means for moving the axis of said cutter toward and away from said fixed axis during such traversing movement, an arcuate templet located on the opposite side of said axis to that of the axis of said cutter, the center of the radius of the arc of said templet being disposed toward said fixed axis, means for connecting said last named moving means to said templet for controlling the movement of the axis of said cutter toward and away from said fixed axis, and means for rotating said cutter about its own axis in timed relation to the rate of rotation of said worm, and in timed relation with respect to its position in such traversing movement.

5. In a machine for cutting worms of the hour glass type, the combination of a molding generating type gear shaped cutter mounted with its axis normal to the axis of the worm to be cut, means for traversing the axis of said cutter about a fixed axis parallel thereto and removed from the axis of said worm, means for moving the axis of said cutter toward and away from said fixed axis during such traversing movement, an arcuate templet located on the opposite side of said axis to that of the axis of said cutter, the center of the radius of the arc of said templet being disposed toward said fixed axis, means for connecting said last named moving means to said templet for controlling the movement of the axis of said cutter toward and away from said fixed axis, adjustable means for varying the location of said templet with respect to said fixed axis, and means for rotating said cutter about its own axis in timed relation to the rate of rotation of said worm.

6. In a machine for cutting worms of the hour glass type, the combination of a molding generating type gear shaped cutter mounted with its axis normal to the axis of the worm to be cut, means for traversing the axis of said cutter about a fixed axis parallel thereto and removed from the axis of said worm, means for moving the axis of said cutter toward and away from said fixed axis during such traversing movement, an arcuate templet located on the opposite side of said axis to that of the axis of said cutter, the center of the radius of the arc of said templet being disposed toward said fixed axis, means for connecting said last named moving means to said templet for controlling the movement of the axis of said cutter toward and away from said fixed axis, adjustable means for varying the location of said templet with respect to said fixed axis, and means for rotating said cutter about its own axis in timed relation to the rate of rotation of said worm, and in timed relation with respect to its position in such traversing movement.

7. In a machine for cutting worms of the hour glass type, the combination of a base member rotatable about a fixed axis, a carriage slidably mounted on said base member and carrying a molding generating type gear shaped cutter with its axis normal to the axis of the worm to be cut, an arcuate track adjacent said carriage and contacting therewith for controlling the slidable movement of said carriage during rotation of said base member, adjustable means for varying the location of said track with respect to said fixed axis, adjustable means for varying the location of said carriage with respect to said fixed axis, and means for rotating said cutter about its own axis in timed relation to the rate of rotation of said worm, and in timed relation with respect to the rotation of said base member.

JOSEPH R. RICHER.